E. F. STENMAN.
FASTENER.
APPLICATION FILED SEPT. 4, 1917. RENEWED MAY 28, 1919.
1,326,543.
Patented Dec. 30, 1919.
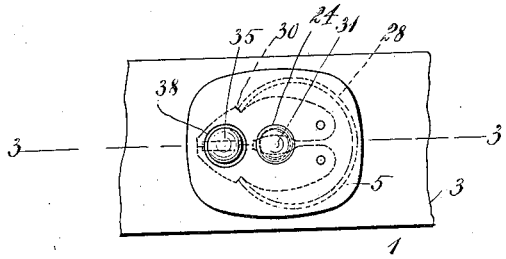
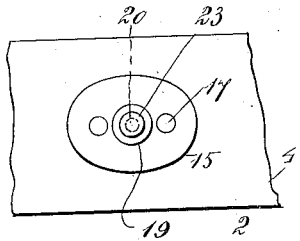
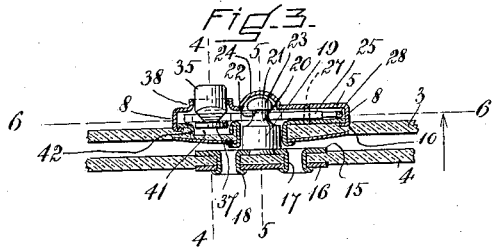
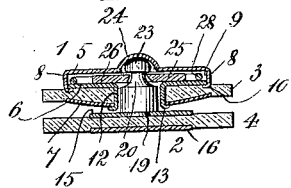
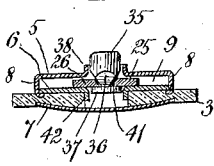
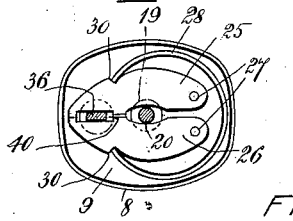
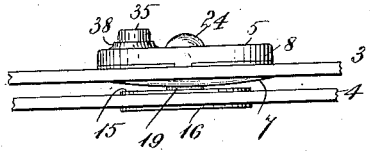
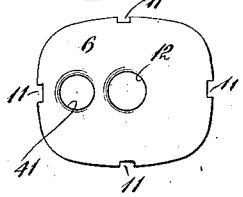
INVENTOR
Elis F. Stenman
By Coale + Shay
HIS ATTORNEYS

UNITED STATES PATENT OFFICE.

ELIS F. STENMAN, OF LYNN, MASSACHUSETTS, ASSIGNOR TO SPRING SNAP FASTENER COMPANY, OF LYNN, MASSACHUSETTS, A CORPORATION OF MASSACHUSETTS.

FASTENER.

1,326,543.     Specification of Letters Patent.     Patented Dec. 30, 1919.

Application filed September 4, 1917, Serial No. 189,515. Renewed May 28, 1919. Serial No. 300,481.

*To all whom it may concern:*

Be it known that I, ELIS F. STENMAN, of Lynn, in the county of Essex and State of Massachusetts, a citizen of the United States, have invented a new and useful Improvement in Fasteners, of which the following is a specification.

The present invention relates to a stud and socket fastener especially adapted for holding together or securing parts incidental to automobiles, aeroplanes, boats and handbags, or such other parts or materials as require a strong and secure fastening.

The object of my invention is to provide a fastener of the above character, the elements of which are easily formed, easily assembled and readily attachable to the parts to be joined and which will insure a positive, strong and durable connection and one not injuriously affected by rough usage.

My invention can best be seen and understood by reference to the drawings, in which—

Figure 1 is a plan of the fastener.

Fig. 2 is a plan of the stud portion thereof.

Fig. 3 is a section on the line 3—3 of Fig. 1.

Fig. 4 is a section on the line 4—4 of Fig. 3.

Fig. 5 is a section on the line 5—5 of Fig. 3.

Fig. 6 is a plan taken on line 6—6 of Fig. 3.

Fig. 7 is a side elevation of a complete fastener.

Fig. 8 is a plan of a certain detail of construction to which special reference will later be made.

The fastener consists of a socket member 1 which is attached to one of the parts to be fastened together and a stud member 2 attached to the other part. 3 and 4 respectively, indicate the parts or material to which the respective socket and stud members are secured.

The body or shell of the socket member comprises a chamber forming portion which contains certain of the operating parts later to be referred to and an attaching portion. The body is made up of three plates consisting of a face plate 5, a partition plate 6 and a back plate 7. Of these plates the partition plate 6 is common to both the chamber forming portion and the attaching portion of the socket member for it combines with the face plate 5 to form the chambered portion of the member and with the back plate 7 to form the attaching portion.

The face plate 5 is provided with a turned edge 8 which extends to bear against the plate 6 just adjacent to the outer edge thereof and by the interposition of this edge the plates 5 and 6 are separated from one another to form the chamber 9 of the socket member. The edge 8 of the plate 5 is provided with a number of fingers 10 which pass through slots 11 cut in the edge of the plate 6 and are turned to clench back of this plate thereby holding the plates 5 and 6 together.

The plate 6 is provided with a central opening and from and around this opening there projects from the plate a hollow tubular shank 12. This shank passes through an opening formed in the part or material 3 to which the socket member is secured and through an opening formed in the back plate 7. The end 13 of the shank is turned outwardly to bear against the back plate around the opening in it in the manner of a rivet with the effect of drawing the plates 6 and 7 together and binding the material between them, the member being thus secured to the material by the bearing of the plates and by the engagement of the shank which passes through the material. The back plate 7 is preferably so dished that the outer edge of the plate will bite into the part of the material 3 to which the socket member is secured in order to effect a smooth and finished surface, and to assist, also, in the retention of the entire member.

The stud member 2 comprises spaced plates or disks 15 and 16, respectively. Struck from the plate 15 are tubular shanks 17 which pass through the material 4 to which the stud member is secured and also through openings formed in the plate 16. The ends 18 of the shanks are turned outwardly to bear against the plate 16 and headed in the manner of rivets, thereby drawing the two plates together and binding the material between them, the member being thus secured to the material by the bearing of the plates and the engagement of the shanks which pass through the material.

Carried by the plate 15 is a stud of which 19 represents the body of the stud, 20 a contracted neck portion, and 21 the head of the stud. The neck portion of the stud presents a relatively narrow contraction. From the neck the enlargement of the head is so abrupt as to form a sharply defined edge 22 on the under side of the head. The top 23 of the head is rounded. When the stud and socket members are brought together the body of the stud will fit snugly within the hollow of the shank 12 of the socket member, the neck of the stud will lie within the chamber 9 thereof, and the head of the stud will extend upwardly into the interior of a hollow boss 24 formed centrally on the face plate 5 and which acts to conceal and protect the head of the stud. When thus brought together a releasable retention of the members is obtained as follows:—

Contained within the chamber 9 of the socket member is a set of jaws 25 and 26, respectively. These jaws are arranged in opposition to one another, each turning on a pin 27 which extends between the plates 5 and 6 and are riveted to them. The jaws are held normally together by means of a spring 28. This spring is located within the chamber 9 of the socket member and the ends of the spring bear against the outer sides of the jaws, which are provided with suitable shoulders 30 against which the ends of the spring have bearing. The normal position of the jaws when held together by the spring is such that they will extend over the central opening in the partition plate 6 and close this opening excepting for an opening 31 formed in the jaws, the inner sides of each of the jaws being notched to provide this opening. The opening 31 is smaller than the head of the stud and is about equal in size to the neck of the stud so that when the stud and socket members are brought together the jaws will embrace the neck of the stud located in the chamber 9 and thereby hold the stud member by the bearing of the edge 22 to the head of the stud against the jaws beyond the opening in them. When the stud and socket members are brought together the head of the stud will bear against the jaws around the opening 31 in them and when pressure is exerted the jaws will be spread by the head which then passes between the jaws. The spreading of the jaws by the head is permitted by the yielding of the spring and after the head has passed between the jaws the spring will return the jaws to embrace the neck of the stud. In order that the insertion of the head of the stud may readily spread the jaws and overcome the tension exerted by the spring, the jaws are beveled around the opening in them to conform substantially with the rounding top surface of the head of the stud.

With the members thus held in engagement with one another a separation cannot be obtained except by a separation of the jaws for releasing the head of the stud. The separation of the jaws is obtained by means of a pusher having a short, preferably cylindrical portion, or thumb piece 35, a beveled wedge-shaped portion 36 and a flange forming portion 37. The thumb piece 35 extends through an opening formed in the face plate 5 opposite the outer extension of the jaws when occupying a closed position. The extension of the thumb piece is such that it will present an exposed top end for receiving the pressure of the thumb or finger for depressing the thumb piece above a short sleeve 38. This sleeve rises from the plate 5 around the opening in it through which the thumb piece extends and acts as a guide for the thumb piece during any depression thereof and subsequent return movement.

The beveled wedge-shaped portion 36 of the pusher extends through an opening 40 between the jaws which are suitably notched to form such opening and permit of the extension of the wedge-shaped portion of the pusher between them when the jaws are occupying a closed position. In this connection also it will be observed that the inner sides of the jaws at the points of the notches in them forming the opening 40 are beveled to correspond with the beveled portion 36 of the pusher so that when the pusher is depressed by the thumb or finger it may operate in the manner of a wedge and separate the jaws. The flange forming portion 37 of the pusher lies back of or beneath the jaws and within an opening 41 formed within the partition plate 6. This opening is extended and a socket provided permitting of the movement imparted to the flange when the pusher is depressed for opening the jaws by means of a tubular extension 42 from the plate 6 which bites into and depresses the part or material 3 to which the socket member is secured. The jaws prevent the withdrawal of the pusher from the socket member inasmuch as the flange 37 is made sufficiently large to engage the jaws in both their closed and open positions.

The pusher is maintained normally in a raised operative position and after depression is returned to such position by the spring acting through the jaws. When the jaws are closed (they are held normally closed by the spring) the pusher will be maintained through the engagement of the jaws with the beveled wedge-shaped portion 36 of the pusher in an elevated position. After the depression of the pusher for opening the jaws the subsequent closing of the jaws by the spring will raise the pusher through the engagement of the jaws with the beveled wedge-shaped portion 36 of the pusher.

Having thus fully described my invention,

I claim and desire to secure by Letters Patent of the United States:

1. In a fastener, the combination comprising a socket member having a face plate, a back plate, and a partition plate, said face plate coöperating with said partition plate and attached thereto to form a casing, said partition plate having an opening in it and a hollow shank projecting from and around said opening and through an opening in said back plate to connect therewith and form the attaching portion of said socket member, a stud member having a stud extensible through the opening in said back plate hollow of said shank and opening in said partition plate into the chamber of said casing, and a releasable means contained within the chamber of said casing for retaining said stud.

2. In a fastener, the combination comprising a socket member having a face plate, a back plate, and a partition plate, said face plate coöperating with said partition plate and attached thereto to form a casing, said partition plate having an opening in it and a hollow shank projecting from and around said opening and through an opening in said back plate to connect therewith and form the attaching portion of said socket member, a stud member having a stud extensible through the opening in said back plate hollow of said shank and opening in said partition plate into the chamber of said casing, a releasable means contained within said casing for retaining said stud, and means consisting of a pusher extensible through said face plate for affecting a release of said stud.

3. In a fastener, a socket member having a casing with a stud receiving opening in it, jaws arranged within said casing and partially closing said opening when the jaws are occupying a closed position, means for yieldingly maintaining said jaws to occupy a normally closed position, and a pusher for opening said jaws when closed, said pusher having a thumb piece accessible from without said casing, and a wedge-shaped portion extending between said jaws whereby the jaws may be opened upon depressing said pusher and the pusher returned by said jaws upon the closure thereof.

4. In a fastener, a socket member having a casing with a stud receiving opening in it, jaws arranged within said casing and partially closing said opening when the jaws are occupying a closed position, means for yieldingly maintaining said jaws to occupy a normally closed position, and a pusher for opening said jaws when closed, said pusher having a thumb piece accessible from without said casing, a beveled wedge-shaped portion extending between the jaws, and a flange forming retaining portion arranged beneath the jaws.

5. In a fastener, a socket member having a face plate, a back plate, and a partition plate, said face plate coöperating with said partition plate and attached thereto to form a casing, said partition plate having openings in it, one a stud receiving opening, the other an opening offset therefrom, a hollow shank projecting from and around said stud receiving opening and through an opening in said back plate to connect therewith and form the attaching portion of said socket member, stud holding jaws arranged within said casing and partially closing said stud receiving opening when said jaws are occupying a closed position, means for yieldingly maintaining said jaws to occupy a normally closed position, and a pusher for opening said jaws when closed, said pusher having a thumb piece extending through said face plate whereby it may be accessible from without said casing, a beveled wedge-shaped portion extending between said jaws, and a flange forming portion arranged beneath the jaws and movable through said offset opening in the partition plate when the pusher is depressed.

ELIS F. STENMAN.